(12) United States Patent
Awatsu et al.

(10) Patent No.: US 7,508,957 B2
(45) Date of Patent: Mar. 24, 2009

(54) METHOD OF REGISTRATION OF AUTHORIZED AGENT INFORMATION FOR A BIOMETRICS AUTHENTICATION DEVICE, AUTHENTICATION METHOD FOR A BIOMETRICS AUTHENTICATION DEVICE, AND BIOMETRICS AUTHENTICATION DEVICE

(75) Inventors: Kiyotaka Awatsu, Inagi (JP); Takahiro Kudoh, Inagi (JP); Masashi Sano, Inagi (JP); Masanori Ohkoshi, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 614 days.

(21) Appl. No.: 11/169,898

(22) Filed: Jun. 30, 2005

(65) Prior Publication Data

US 2006/0193499 A1   Aug. 31, 2006

(30) Foreign Application Priority Data

Feb. 25, 2005   (JP)   ............................. 2005-051726

(51) Int. Cl.
*G06K 9/00*   (2006.01)

(52) U.S. Cl. ...................................................... 382/115

(58) Field of Classification Search ......... 382/115–119, 382/124, 137, 139, 209, 218, 309; 235/380, 235/382, 382.5, 386; 340/5.2, 5.21, 5.53; 705/44, 67; 713/186; 902/3
See application file for complete search history.

(56) References Cited

U.S. PATENT DOCUMENTS

| | | | | |
|---|---|---|---|---|
| 6,012,636 | A * | 1/2000 | Smith | ........................ 235/380 |
| 6,213,391 | B1 | 4/2001 | Lewis | |
| 6,394,343 | B1 * | 5/2002 | Berg et al. | .................. 235/379 |
| 6,611,819 | B1 * | 8/2003 | Oneda | ........................ 705/41 |
| 6,636,620 | B1 * | 10/2003 | Hoshino | .................... 382/124 |
| 2002/0095386 | A1 * | 7/2002 | Maritzen et al. | .............. 705/64 |
| 2002/0178124 | A1 * | 11/2002 | Lewis | ........................ 705/67 |
| 2003/0005336 | A1 | 1/2003 | Poo et al. | |
| 2003/0074568 | A1 | 4/2003 | Kinsella et al. | |
| 2006/0193500 | A1 | 8/2006 | Awatsu et al. | |

FOREIGN PATENT DOCUMENTS

CN   1560789 A   1/2005

(Continued)

OTHER PUBLICATIONS

European Search Report dated Nov. 7, 2005 issued in corresponding Application No. 05014026.

(Continued)

*Primary Examiner*—Daniel G Mariam
(74) *Attorney, Agent, or Firm*—Westerman, Hattori, Daniels & Adrian, LLP.

(57) ABSTRACT

A biometrics authentication device uses biometrics information for individual authentication, and securely registers biometrics information for an authorized agent other than the principal. Biometrics information for the principal, registered in an IC card, is verified against biometrics information detected by a detection unit, and when biometrics authentication of the principal is satisfactory, biometrics information registration for an authorized agent is performed using the detection unit. Biometrics information for the authorized agent can be registered securely in the card in which is registered the biometrics information for the principal.

27 Claims, 12 Drawing Sheets

FOREIGN PATENT DOCUMENTS

| | | |
|---|---|---|
| CN | 1825244 A | 3/2006 |
| EP | 0 864 996 A2 | 9/1998 |
| JP | 09-114983 | 5/1997 |
| JP | 10-312459 | 11/1998 |
| JP | 2000-293643 | 10/2000 |
| JP | 2001-067523 | 3/2001 |
| JP | 2001-134738 | 5/2001 |
| JP | 2001-202494 | 7/2001 |
| JP | 2002-222168 A | 8/2002 |
| WO | WO 03/054806 A2 | 7/2003 |

OTHER PUBLICATIONS

Chinese Office Action dated May 11, 2007 issued in corresponding Chinese Patent Application 2005100843817.

Office Action dated Oct. 2, 2006 issued in corresponding Korean Application No. 10-2005-0065128.

* cited by examiner

VEIN IMAGE N1

|   | 0 | 1 | 2 | 3 | 4 |
|---|---|---|---|---|---|
| 0 | 255 | 255 | 0 | 255 | 255 |
| 1 | 255 | 255 | 0 | 0 | 0 |
| 2 | 255 | 255 | 0 | 255 | 0 |
| 3 | 0 | 0 | 255 | 0 | 0 |
| 4 | 0 | 0 | 0 | 255 | 0 |

VEIN IMAGE N2

|   | 0 | 1 | 2 | 3 | 4 |
|---|---|---|---|---|---|
| 0 | 255 | 255 | 0 | 0 | 255 |
| 1 | 255 | 255 | 255 | 0 | 0 |
| 2 | 255 | 255 | 0 | 255 | 255 |
| 3 | 0 | 0 | 255 | 255 | 0 |
| 4 | 0 | 0 | 0 | 255 | 255 |

METHOD OF REGISTRATION OF AUTHORIZED AGENT INFORMATION FOR A BIOMETRICS AUTHENTICATION DEVICE, AUTHENTICATION METHOD FOR A BIOMETRICS AUTHENTICATION DEVICE, AND BIOMETRICS AUTHENTICATION DEVICE

CROSS-REFERENCE TO RELATED APPLICATIONS

This application is based upon and claims the benefit of priority from the prior Japanese Patent Application No. 2005-051726, filed on Feb. 25, 2005, the entire contents of which are incorporated herein by reference.

BACKGROUND OF THE INVENTION

1. Field of the Invention

This invention relates to a method of registration of authorized agent information for a biometrics authentication device, an authentication method for a biometrics authentication device, and a biometrics authentication device, which uses biometrics characteristics of a portion of the human body, and in particular relates to a method of registration of authorized agent information for a biometrics authentication device, an authentication method for a biometrics authentication device, and a biometrics authentication device to permit individual authentication, by means of biometrics information, of an authorized agent other than the principal.

2. Description of the Related Art

There are numerous portions of the human body which can differentiate the individual, such as fingerprints and toeprints, the retinas of the eyes, facial features, and blood vessels. With advances in biometrics technology in recent years, various devices have been provided which identify biometrics features of a portion of the human body to authenticate individuals.

For example, because blood vessels and prints of the palms and fingers of the hands provide a comparatively large quantity of individual characteristic data, they are suitable with respect to reliability of individual authentication. Blood vessel (vein) patterns in particular remain unchanged throughout life from infancy and are regarded as being completely unique, and so are well-suited to individual authentication. Of this, individual authentication technology based on blood vessel images in the palm of the hand is explained.

First, at the time of registration or of authentication, the user brings his palm into proximity with an image capture device. The image capture device emits near-infrared rays, which are incident on the palm of the hand. The image capture device uses a sensor to capture near-infrared rays rebounding from the palm of the hand. Hemoglobin in the red corpuscles flowing in the veins has lost oxygen. This hemoglobin (reduced hemoglobin) absorbs near-infrared rays at wavelengths near 760 nanometers. Consequently when near-infrared rays are made incident on the palm of a hand, reflection is reduced only in the areas in which there are veins, and the intensity of the reflected near-infrared rays can be used to identify the positions of veins.

The user first uses an image capture device to register vein image data of the palm of his or her own hand on a card. Then, in order to perform individual authentication, the user employs an image capture device to read the vein image data of his or her own hand. The registered vein image retrieved using the ID of the user is verified against the vein pattern of the vein image for verification thus read to perform individual authentication.

On the other hand, in the field of fingerprint authentication, a method of biometrics authentication of an authorized agent has been proposed in which fingerprint information for an authorized agent other than the principal is registered in advance, and by performing fingerprint authorization of the authorized agent, a single card can be used for biometrics authentication of an authorized agent (see for example Japanese Patent Laid-open No. 2001-067523 (FIG. 6, FIG. 7) and Japanese Patent Laid-open No. 2001-202494 (FIG. 2)).

In this technology of the prior art, an authorized agent who has received the consent of the principal can have his fingerprints registered, and can undergo individual authentication. In this method of the prior art, at the time of card issue, biometrics information of the principle and the biometrics information for the authorized agent are registered based on the authorization of the principal.

On the other hand, in an actual aspect there is the requirement that the biometrics information of the authorized agent be registered, modified, or deleted on a card on which the biometrics information of the principal has first been registered. Using the technology of the prior art, however, it is difficult to register, modify, or delete the biometrics information of the authorized agent securely to meet this requirement, and the security of biometrics authentication is impeded. Hence actual use is exceedingly difficult.

SUMMARY OF THE INVENTION

Hence an object of this invention is to provide a method of registration of authorized agent information for a biometrics authentication device, an authentication method for a biometrics authentication device, and a biometrics authentication device, to securely register the biometrics information of an authorized agent on a card on which biometrics information for the principal has been registered.

Another object of the invention is to provide a method of registration of authorized agent information for a biometrics authentication device, an authentication method for a biometrics authentication device, and a biometrics authentication device, to securely perform modification and deletion of the biometrics information of an authorized agent on a card on which biometrics information for the principal has been registered.

Still another object of the invention is to provide a method of registration of authorized agent information for a biometrics authentication device, an authentication method for a biometrics authentication device, and a biometrics authentication device, to securely perform modification of the biometrics information of an authorized agent, and to maintain the security of biometrics authentication for the authorized agent as well as the principal.

In order to attain these objects, in an authorized agent information registration method of this invention, biometrics characteristic data is detected from a human body and is verified against biometrics characteristic data registered in advance in an IC card, to perform individual authentication. This registration method has a step of detecting the biometrics characteristic data from the body; a step of verifying the detected biometrics characteristic data against biometrics characteristic data for the principal registered in advance in the IC card; when the verification result is satisfactory, a step of detecting biometrics characteristic data from a human body other than that of the principal; and a step of registering the biometrics characteristic data for a body other than that of the principal in the IC card.

Further, in a biometrics authentication method of this invention, biometrics characteristic data is detected from a human body and is verified against biometrics characteristic data registered in advance in an IC card, to perform individual authentication. This authentication method has a step of detecting the biometrics characteristic data from the body; a step of verifying the detected biometrics characteristic data against biometrics characteristic data for the principal registered in advance in an IC card; when, the verification result is satisfactory, a step of detecting biometrics characteristic data from a human body other than that of the principal; a step of registering the biometrics characteristic data from the authorized agent other than the principal in the IC card; a step of detecting biometrics characteristic data from the body; and a step of verifying the detected biometrics characteristic data against the biometrics characteristic data of the principal or of the authorized agent, registered in advance in the IC card.

Further, a biometrics authentication device of this invention detects the biometrics characteristic data from a human body, verifies the detected biometrics characteristic data against biometrics characteristic data registered in advance in an IC card, and performs individual authentication. The device has a detection unit, which detects the biometrics characteristic data from a body, and a verification unit, which verifies the detected biometrics characteristic data against the biometrics characteristic data of the principal, registered in advance in the IC card; when the verification result is satisfactory. And the verification unit detects the biometrics characteristic data from the body of the authorized agent other than the principal, and registers the biometrics characteristic data from the authorized agent other than the principal in the IC card, and also, at the time of individual authentication, detects the biometrics characteristic data from a body, and verifies the detected biometrics characteristic data against the biometrics characteristic data of the principal or of the authorized agent, registered in advance in the IC card.

In this invention, it is preferable that the registration step further have a step of again detecting biometrics characteristic data from the body other than that of the principal, and a step of verifying the previously detected biometrics characteristic data of the authorized agent other than the principal against the again detected biometrics characteristic data of the authorized agent other than the principal.

In this invention, it is preferable that the registration step further have a step of registering the authorization details for an authorized agent other than the principal in the IC card.

In this invention, it is preferable that the method has further a step of deleting the biometrics characteristic data of the authorized agent other than the principal from the IC card, when the verification result is satisfactory, in response to a deletion request the biometrics characteristic data of the authorized agent other than the principal.

In this invention, it is preferable that the method has further a step of modifying and registering the authorization details registered in the IC card, when the verification result is satisfactory, in response to a modification request the authorization details registered in the IC card.

In this invention, it is preferable that the method has further a step of selecting authorization details for authorized agents other than the principal, and that the registration step has a step of registering, in the IC card, the selected authorization details for an authorized agent other than the principal.

In this invention, it is preferable that the selection step have a step of individually selecting the authorization details for the authorized agent other than the principal and a step of selecting transaction details for the principal as the authorization details for the authorized agent other than the principal.

In this invention, it is preferable that the registration step have a step of registering the biometrics characteristic data of the principal and of authorized agents, as well as management data for discriminating and linking the biometrics characteristic data, the principal and authorized agents in the IC card.

In this invention, it is preferable that the registration step have a step of registering, in the IC card, the biometrics characteristic data of the principal and of authorized agents, as well as management data to discriminate the biometrics characteristic data, the principal and authorized agents, and to link this data with the authorization details.

In this invention, when biometrics authentication of the principal is satisfactory, biometrics information registration is performed for an authorized agent, so that biometrics information for an authorized agent can be registered securely on a card on which biometrics information for the principal is registered. Similarly, the biometrics information for an authorized agent can be modified or deleted securely on a card on which biometrics information for the principal is registered.

DESCRIPTION OF THE PREFERRED EMBODIMENTS

Below, embodiments of the invention are explained, in the order of a biometrics authentication device, configuration of biometrics authentication, biometrics information registration/authentication processing, and other embodiments.

Biometrics Authentication Device

Figure 1:
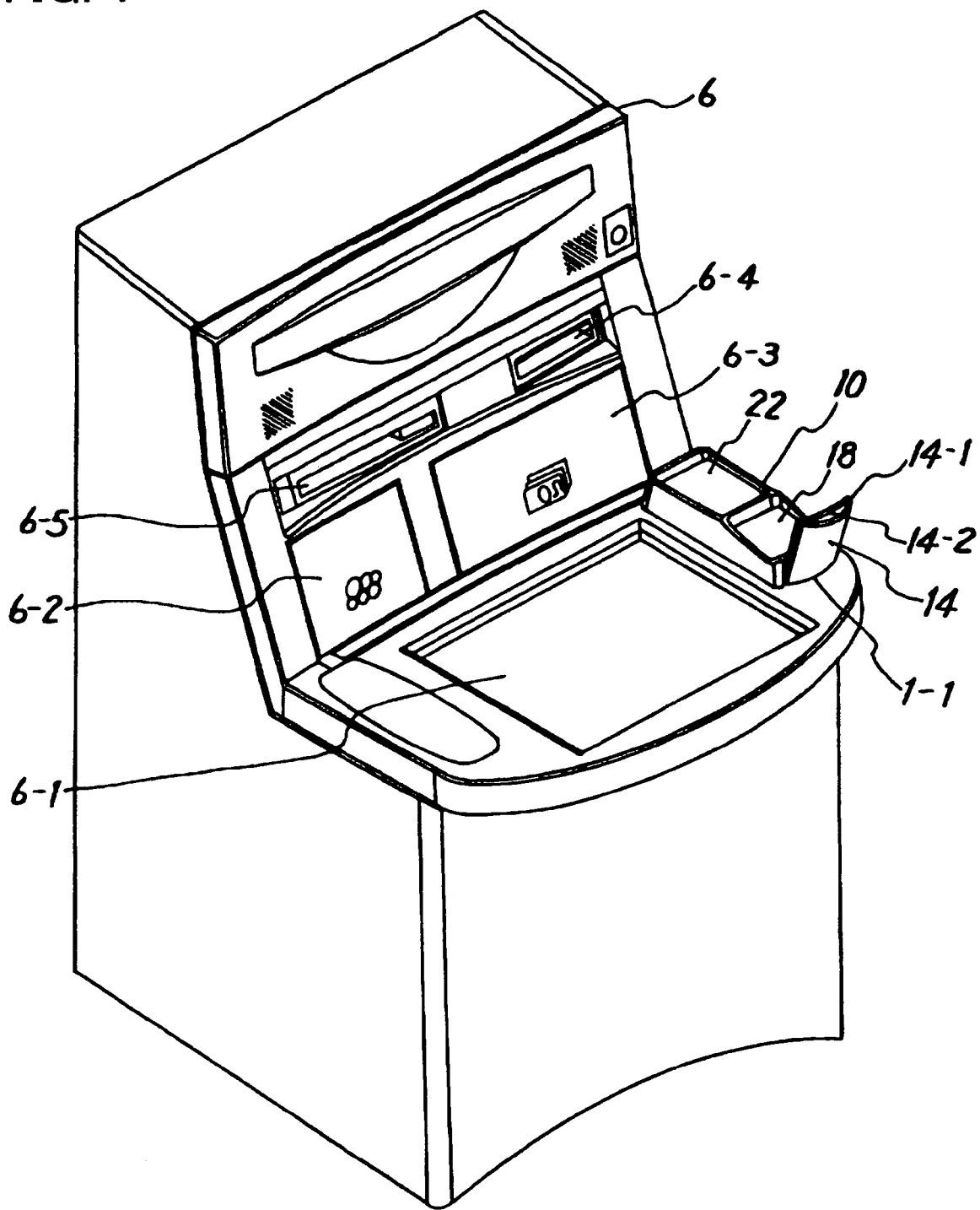
FIG. 1 is a perspective view of the biometrics authentication device of one embodiment of the invention.
Figure 2:
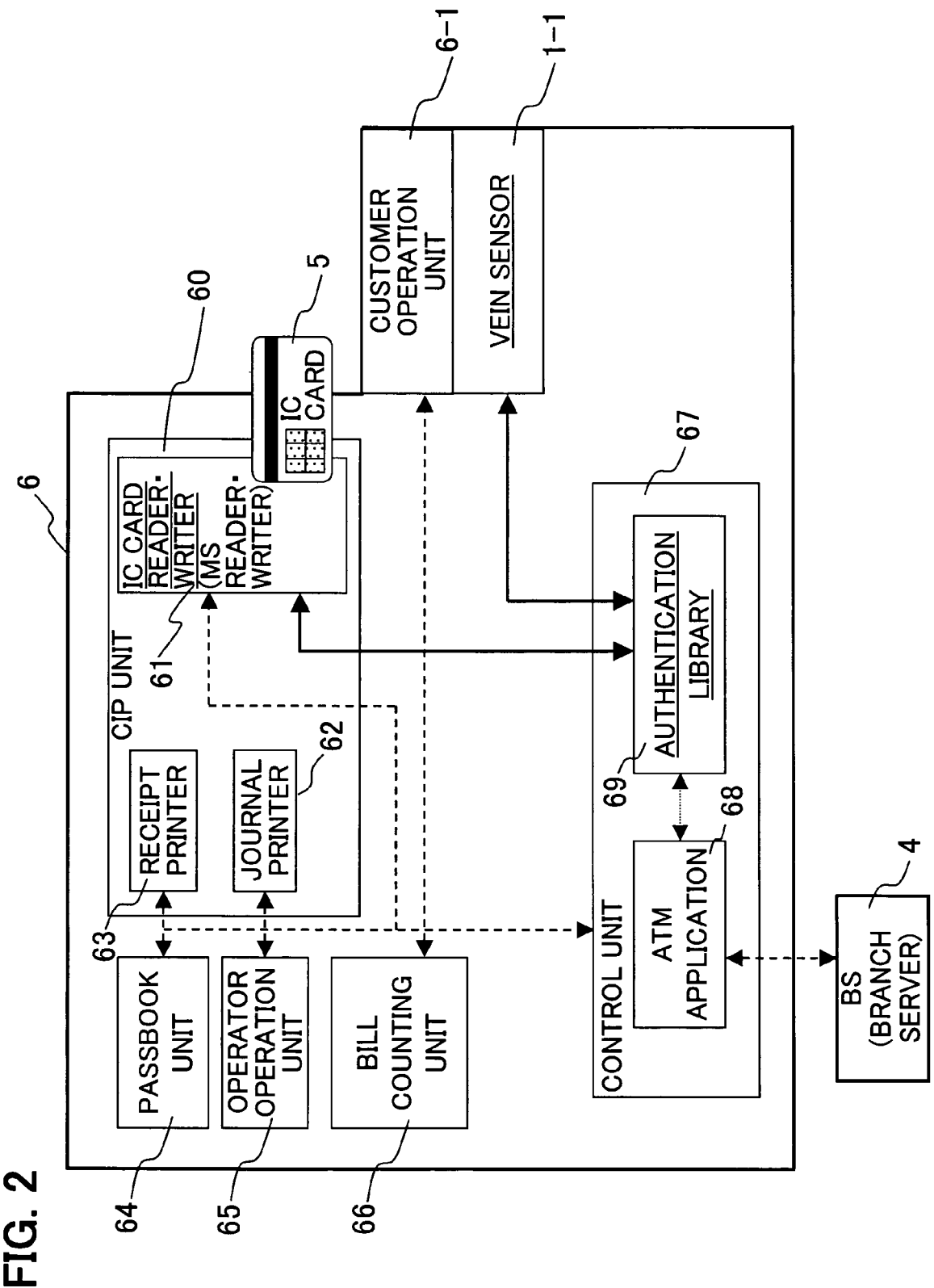
FIG. 2 is a block diagram of the biometrics authentication device of FIG. 1.

FIG. 1 is an external view of the biometrics authentication device of one embodiment of the invention, and FIG. 2 shows the configuration of the biometrics authentication device of FIG. 1. In FIG. 1 and FIG. 2, an automated transaction machine having biometrics authentication functions is explained as an example of a biometrics authentication device.

As shown in FIG. 1, the ATM (automated transaction machine) 6 has, on the front face thereof, a card insertion/ejection aperture 6-4; a bankbook insertion/ejection aperture 6-5; a paper currency insertion/dispensing aperture 6-3; a coin insertion/dispensing aperture 6-2; and a customer operation panel 6-1 for operation and display.

Figure 3:
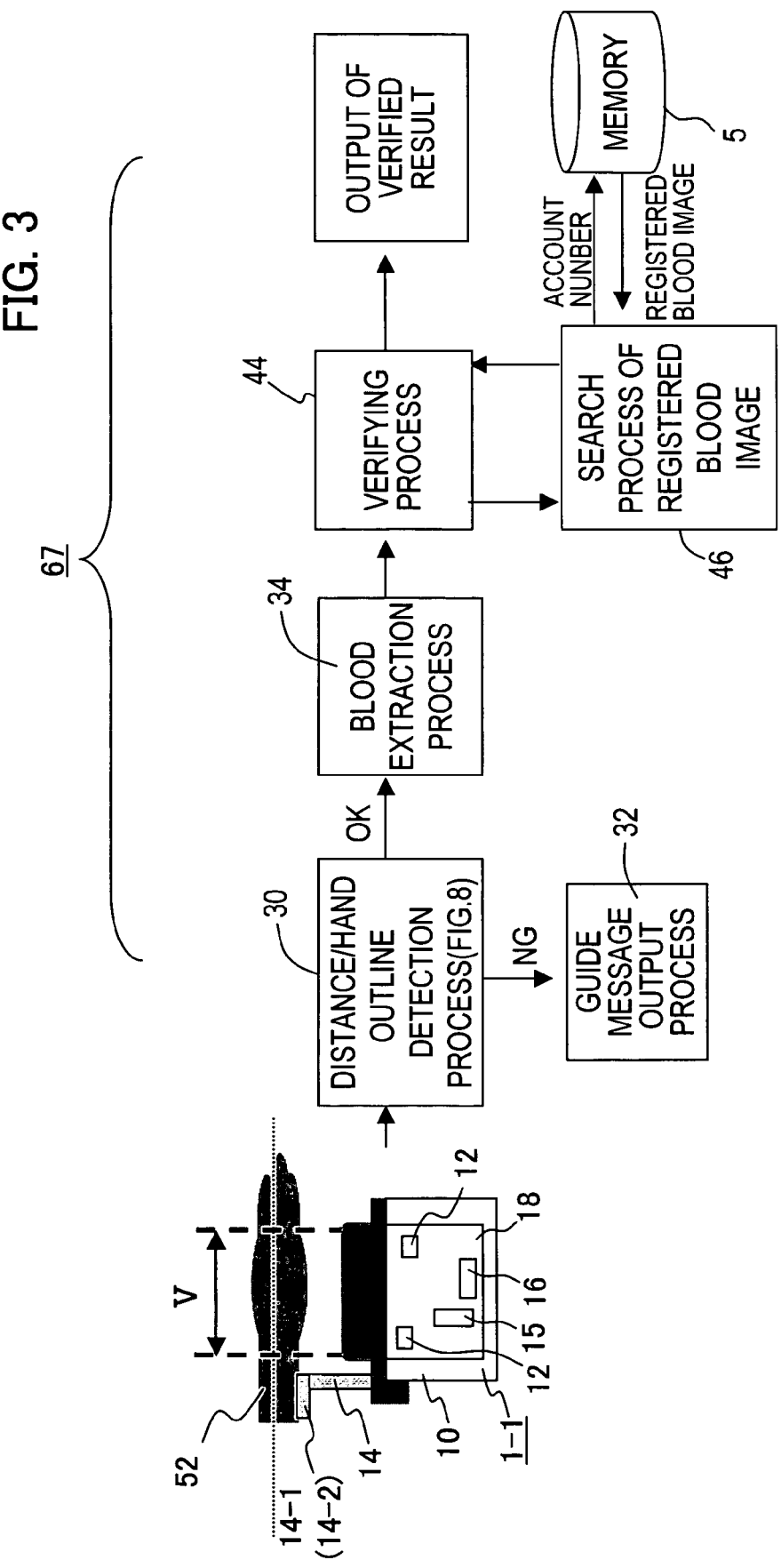
FIG. 3 is a functional block diagram of the biometrics information verification processing of FIG. 2.

The image capture device 1-1 is provided on the side of the customer operation panel 6-1. The sensor unit 18 explained in FIG. 3 is mounted on the forward side of the main unit 10 of the image capture device 1-1. On the forward portion (on the user side) of the sensor unit 18 is provided a front guide 14. The front guide 14 comprises a sheet of synthetic resin, transparent or substantially transparent. In order to serve the purposes of guiding the hand of the user in the front and of supporting the wrist, the cross-sectional shape of the front guide 14 has a vertical body and, in the top portion, a horizontal portion 14-1 to support the wrist.

A depression 14-2 is formed continuously in the center of the horizontal portion 14-1, to facilitate positioning of the wrist. Further, the sensor unit 18 of the main unit 10 faces rearward and is inclined upward, and a flat portion 22 is provided therebehind.

As shown in FIG. 2, the ATM 6 has a CIP (Card Reader Printer) unit 60 having a card insertion/ejection aperture 6-4; a bankbook unit 64 having a bankbook insertion/ejection aperture 6-5; a paper currency/coin counter unit 66 having a paper currency insertion/dispensing aperture 6-3 and a coin insertion/dispensing aperture 6-2; an attendant operation unit 65; a control unit 67; a customer operation panel (UOP) 6-1 for operation and display; and an image capture device (vein sensor) 1-1.

The CIP unit 60 has an IC card reader/writer 61 which reads and writes the magnetic stripe and IC chip of an IC card 5; a receipt printer 63 which records transactions on a receipt; and a journal printer 62 which prints the history of transactions on journal forms.

The bankbook unit 64 records transactions on pages of a bankbook, and when necessary turns the pages. The attendant operation unit 65 is for operations by an attendant, who can display the state and perform operations upon occurrence of a fault or during inspections. The paper currency/coin counting unit 66 validates, counts, and stores inserted paper currency and coins, and counts and dispenses paper currency and coins in the required quantities.

The control unit 67 communicates with the server 4, and has an ATM application 68 which controls ATM operation and an authentication library (program) 69 for authentication processing. A portion of this ATM application 68 acts in concert with the authentication library 69 to control biometrics authentication guidance screens of the UOP 6-1.

Figures 4, 5:
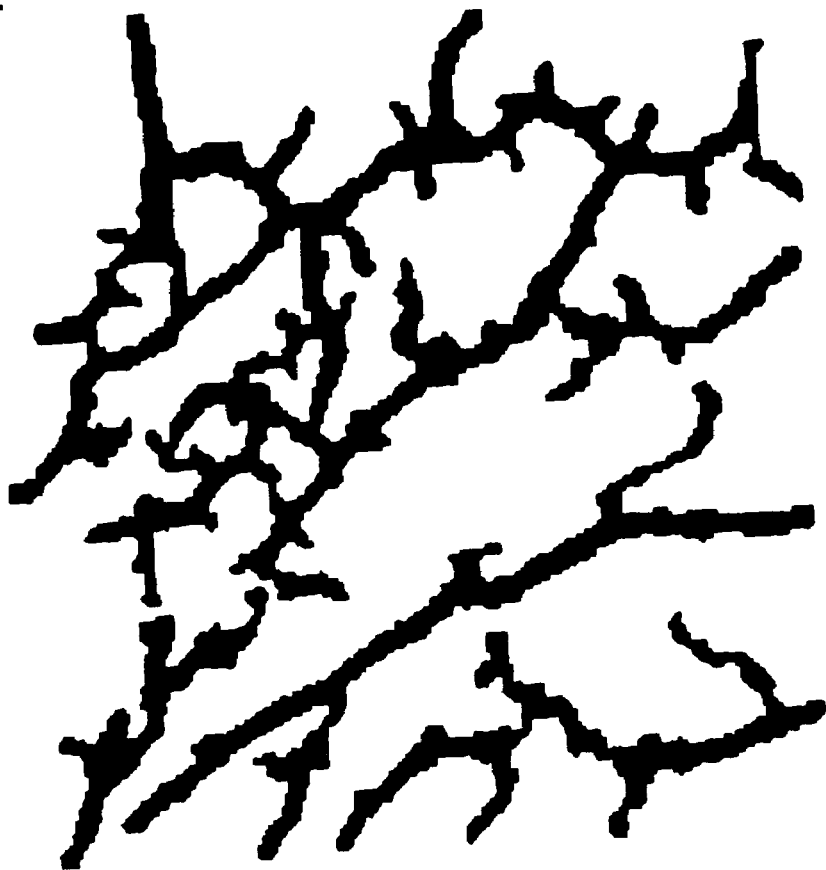
FIG. 4 is an explanatory diagram of the blood vessel image in FIG. 3.
FIG. 5 is an explanatory drawing of the blood vessel image data in FIG. 3.

FIG. 3 is a block diagram of the biometrics authentication processing of one embodiment of the invention, FIG. 4 is an explanatory diagram of the blood vessel image in FIG. 3, and FIG. 5 is an explanatory drawing of the verification processing of FIG. 3.

As shown in FIG. 3, the palm image capture device 1-1 of FIG. 1 is equipped with a sensor unit 18 substantially in the center of the main unit 10. On the forward portion (on the user side) of the sensor unit 18 is provided a front guide 14. The front guide 14 comprises a sheet of synthetic resin, transparent or substantially transparent.

The front guide 14 serves the purposes of guiding the hand of the user in the front and of supporting the wrist. Hence the front guide 14 provides guidance to the user to guide and support the wrist above the sensor unit 18. As a result, the attitude of the palm of the hand, that is, the position, inclination, and size over the sensor unit 18 can be controlled. The cross-sectional shape of the front guide 14 has a vertical body and, in the top portion, a horizontal portion 14-1 to support the wrist. A depression 14-2 is formed continuously in the center of the horizontal portion 14-1, to facilitate positioning of the wrist.

The sensor unit 18 is provided with an infrared sensor (CMOS sensor) and focusing lens 16 and a distance sensor 15 in the center; on the periphery thereof are provided a plurality of near-infrared light emission elements (LEDs) 12. For example, near-infrared light emission elements are provided at eight places on the periphery, to emit near-infrared rays upwards.

The readable region V of this sensor unit 18 is regulated by the relation between the sensor, focusing lens, and near-infrared light emission region. Hence the position and height of the front guide 14 are set such that the supported wrist is positioned in the readable region V.

When the hand is extended with palm flat, the palm has maximum area, and moreover is flat, so that when the palm is subjected to image capture in the image capture region V of the sensor unit 18, an accurate vein pattern which can be used in registration and verification is obtained. When the distance from the sensor unit 18 to the palm is within a prescribed range, a sharp, focused image is obtained by the sensor 16 of the sensor unit 18.

Hence as shown in FIG. 3, by supporting the wrist 52 above the sensor unit 18 using the front guide 14, the position, inclination and height of the palm above the sensor unit 18 are made precise with respect to the image capture range of the sensor unit 18, and the user's hand can be guided and supported.

The authentication library 69 of the control unit 67 of the ATM 6, connected to the image capture device 1-1, executes the series of registration processing 30 to 46. For example, the control unit 67 of the ATM 6 has a CPU, various memory, an interface circuit, and other circuits necessary for data processing. This CPU executes the series of registration processing 30 to 46.

Distance/hand outline detection processing 30 receives the distance measured by the distance sensor 15 of the image capture device 1-1, judges whether the palm of the hand or other object is at a distance in a prescribed range from the sensor unit 18 and also detects the outline of the hand from the image captured by the sensor unit 18, and judges from the outline whether the image can be used in registration and verification processing. For example, the palm may not appear sufficiently in the image.

Guidance message output processing 32 outputs to the UOP 6-1 of the ATM 6 a message guiding the palm to the left or right, forward or backward, upward or downward, when the distance measured by the distance sensor 15 indicates that the hand is outside the image capture range, or when hand outline extraction indicates that the image cannot be used in registration and verification processing. By this means, the hand of the user is guided into position over the image capture device 1-1.

Blood vessel image extraction processing 34 extracts a vein image from the image of the hand when hand outline detection processing 30 judges that an image has been captured with the hand held correctly. That is, grayscale data of the image of the palm such as that of FIG. 5 is obtained through differences in reflectivity. The vein pattern image is an image like that shown in FIG. 4; the data is grayscale data such as that in FIG. 5.

Registered blood vessel search/registration processing 46 registers blood vessel image data for registration in the storage portion of the IC chip in the IC card 5 shown in FIG. 1, and in addition retrieves the registered blood vessel image data R1, R2, R3 corresponding to the individual ID (account number) obtained from the IC card 5. Verification processing 44 compares the blood vessel image data N1 detected in blood vessel image detection processing 34 with registered blood vessel image data N2, performs verification processing, and outputs the verification result, as shown in FIG. 5.

Thus the biometrics authentication device operates by contact-free means, is user-friendly, and handles a large amount of data, so that high-precision individual authentication can be performed.

Configuration of Biometrics Authentication

Figure 6:
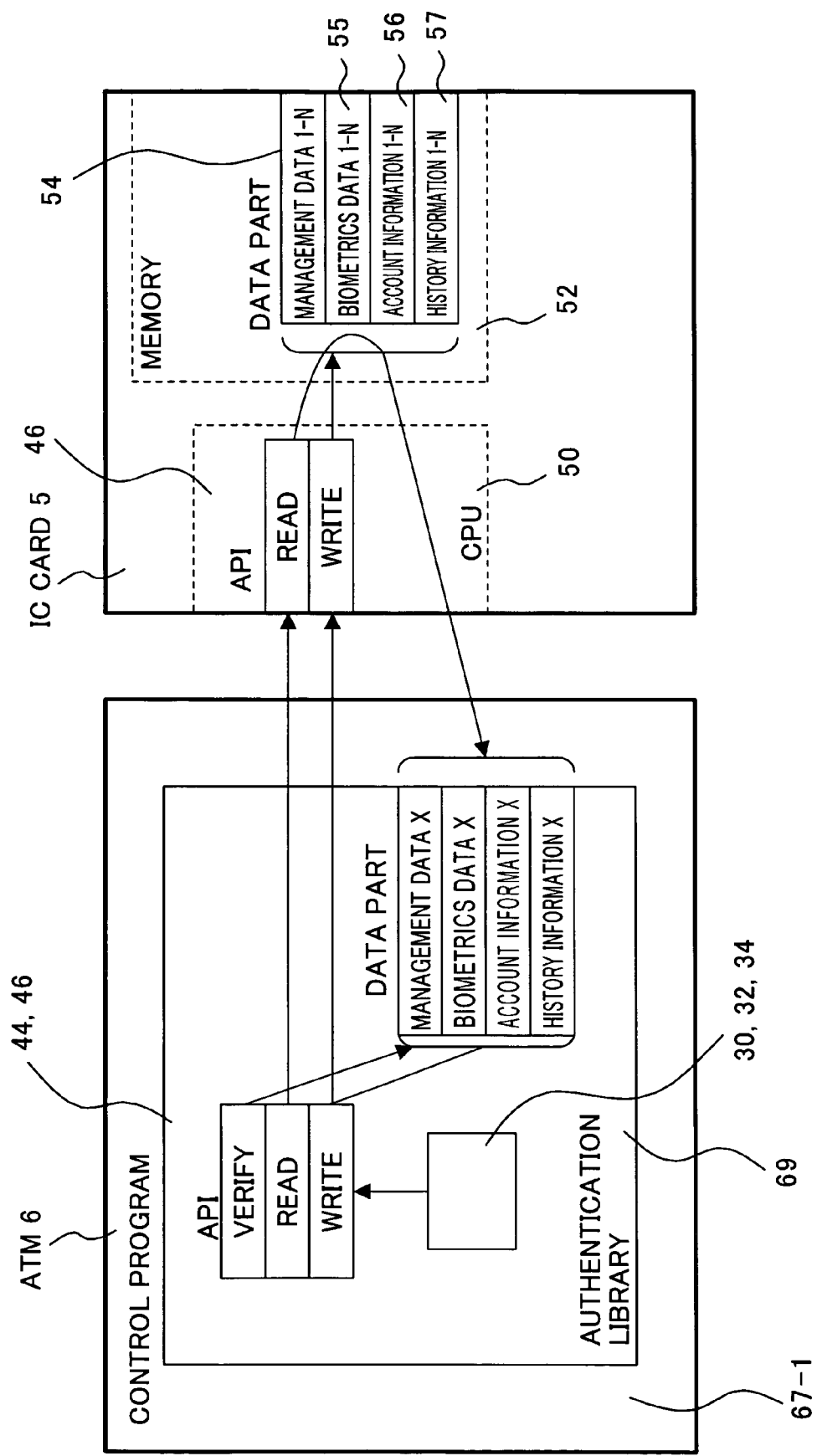
FIG. 6 shows the configuration of an authentication library and IC card in one embodiment of the invention.
Figure 7:
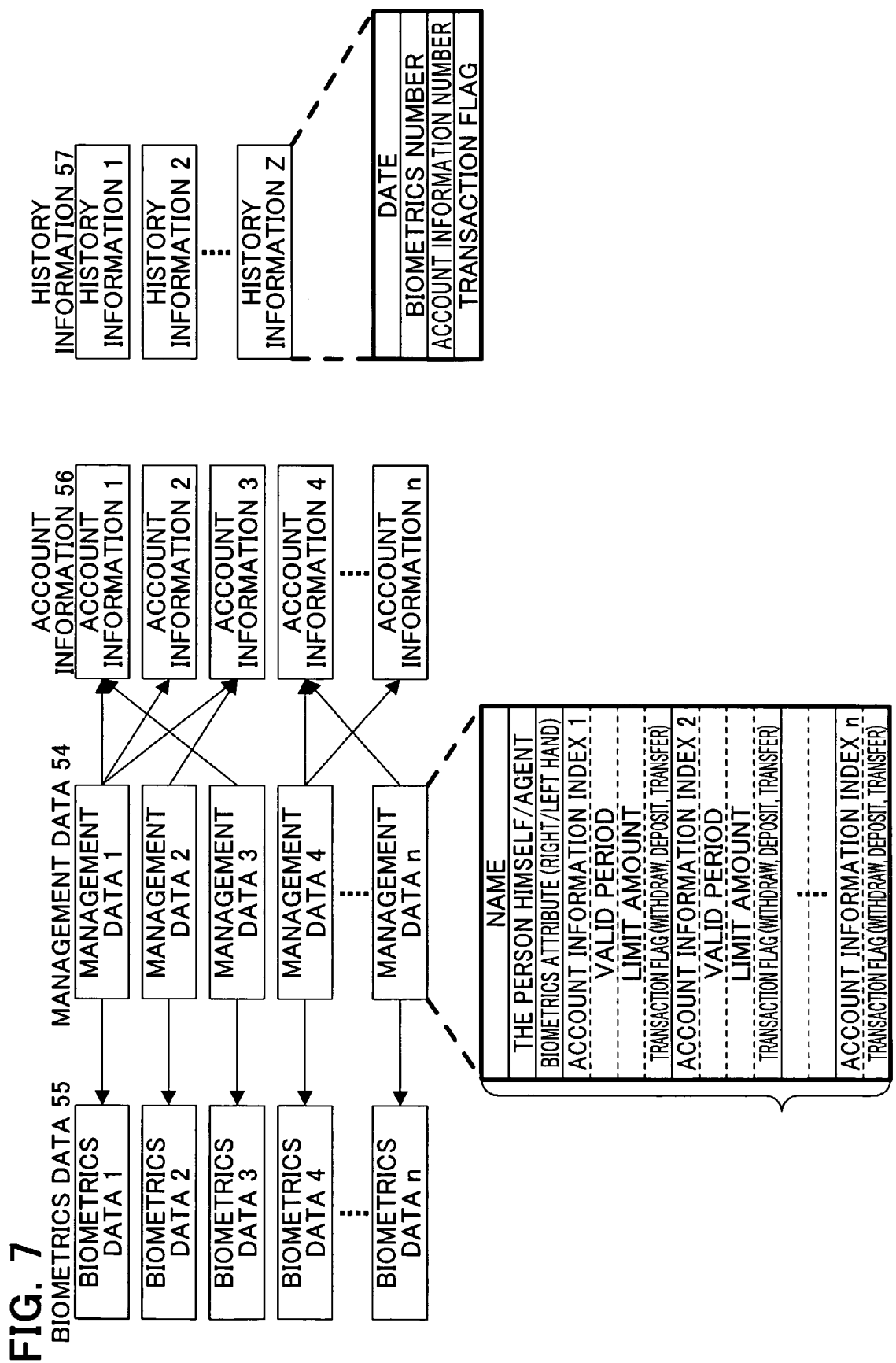
FIG. 7 is an explanatory diagram of biometrics data in the IC card of FIG. 6.

Next, FIG. 6 and FIG. 7 are used to explain the configuration of biometrics authentication in FIG. 2 and FIG. 3. FIG. 6 shows the configuration of the authentication library 69 and IC card 5 in FIG. 2 and FIG. 3; FIG. 7 shows the configuration of the data portion in the IC card 5 of FIG. 6.

As shown in FIG. 6, the authentication library (program) 69 provided in the control program 67-1 of the ATM 6 has the distance/hand outline detection processing portion 30, guidance message output processing portion 32, and blood vessel image extraction processing portion 34 shown in FIG. 3, as well as an application interface (API). This API has the verification processing portion 44, as well as a portion of the registered blood vessel image detection/registration processing (read/write processing) portion 46.

On the other hand, the IC card 5 has a CPU (Central Processing Unit) 50 and memory 52. The CPU 50 executes the other portion of the registered blood vessel image search/registration processing (read/write processing) 46 shown in FIG. 3. The memory 52 has a management data area 54, biometrics data area 55, account information area 56, and history information area 57.

As shown in FIG. 7, the management data area 54 stores access management information '1' through 'n', associating the biometrics data '1' through 'n' of the biometrics data area 55 with the account information '1' through 'n' of the account information area 56.

The access management information (management data) '1' through 'n' comprises the registered name, distinction between principal and proxy (authorized agent), biometrics attributes (for example, whether the registered blood vessel image is for the right hand or the left hand), expiration date for each of the account indexes '1' through 'n', monetary limit, and transaction flag (for example, withdrawal, deposit, or transfer).

Each record of management data '1' through 'n' is associated, through an index, with sets '1' through 'n' of biometrics data in the biometrics data area 55, in a one-to-one relationship. On the other hand, the management data '1' through 'n' and account information are in a one-to-n relationship, with a single set of management data associated with a plurality of sets of account information. That is, a plurality of account information sets are associated with the account indexes '1' through 'n' of the management data, and the transaction flags can be used to define transactions permitted for the account (withdrawal, deposit, transfer, and similar).

The account information stores an account number and account type (checking, saving, fixed-term, or similar). The history information area 57 stores transaction history. As transaction history, the transaction date, biometrics data number, account information number, and transaction flag are stored.

Hence in this embodiment of the invention, a plurality of sets of management data and biometrics data are stored in the IC card 5, and biometrics data can be registered, deleted, and modified according to the details of the management data. That is, the biometrics data of the principal and of an authorized agent (called a "proxy") other than the principal, who has obtained the consent of the principal, can be registered on a single card, and both persons can be authenticated.

As explained below, through verification of the biometrics data of the principal, the identity of the individual can be confirmed, registration of the biometrics data of the above-mentioned proxy and other operations can be permitted, and the security of registration of a proxy using the registration card for the principal can be maintained.

Further, the management data can be used to associate the biometrics data with account information. History information can be used to identify a person executing a transaction, even when a plurality of sets of biometrics data are stored.

Biometrics Information Registration/Authentication Processing

Figure 8:
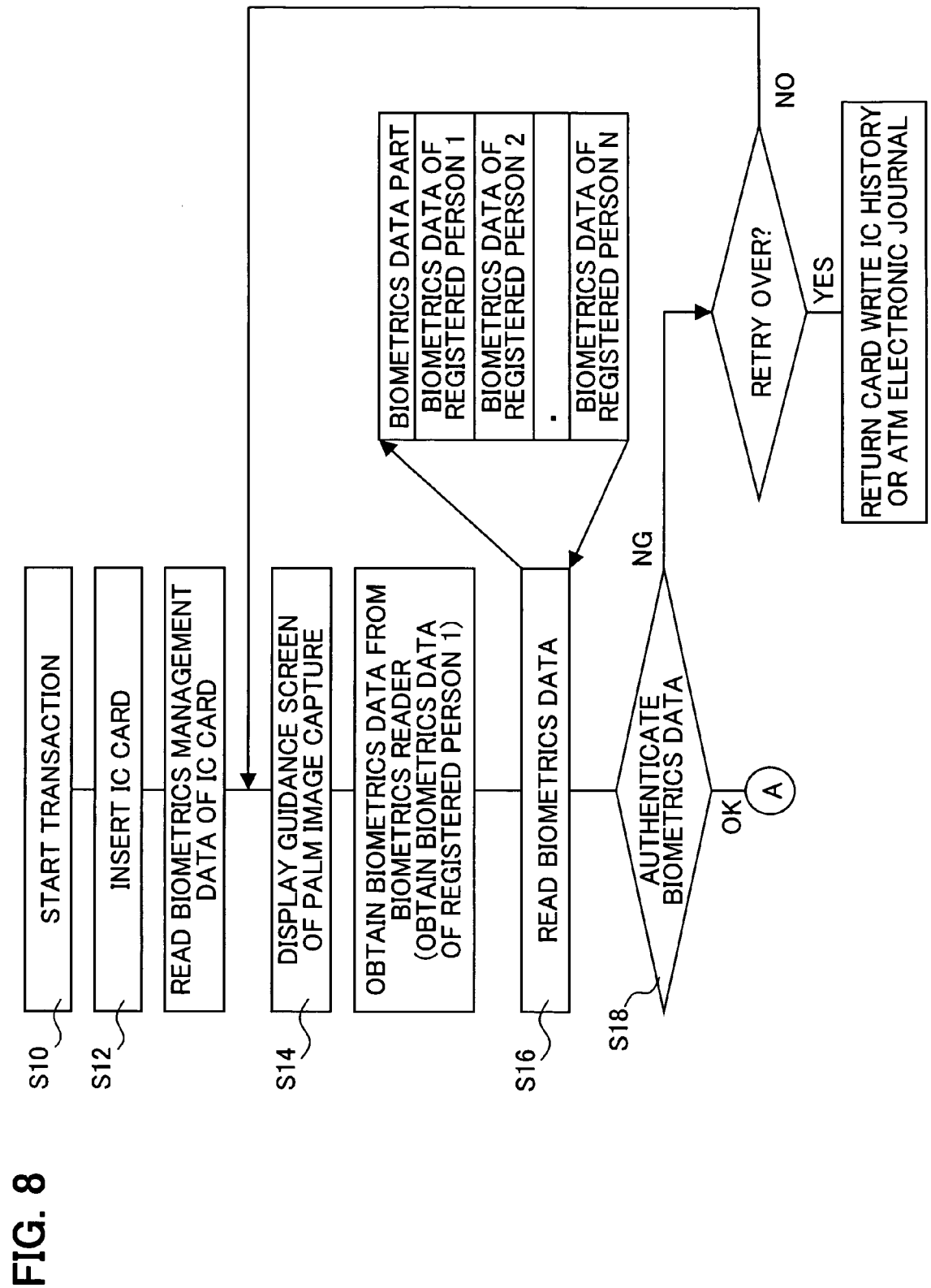
FIG. 8 is a first flow diagram of biometrics authentication and registration processing in this invention.
Figure 9:
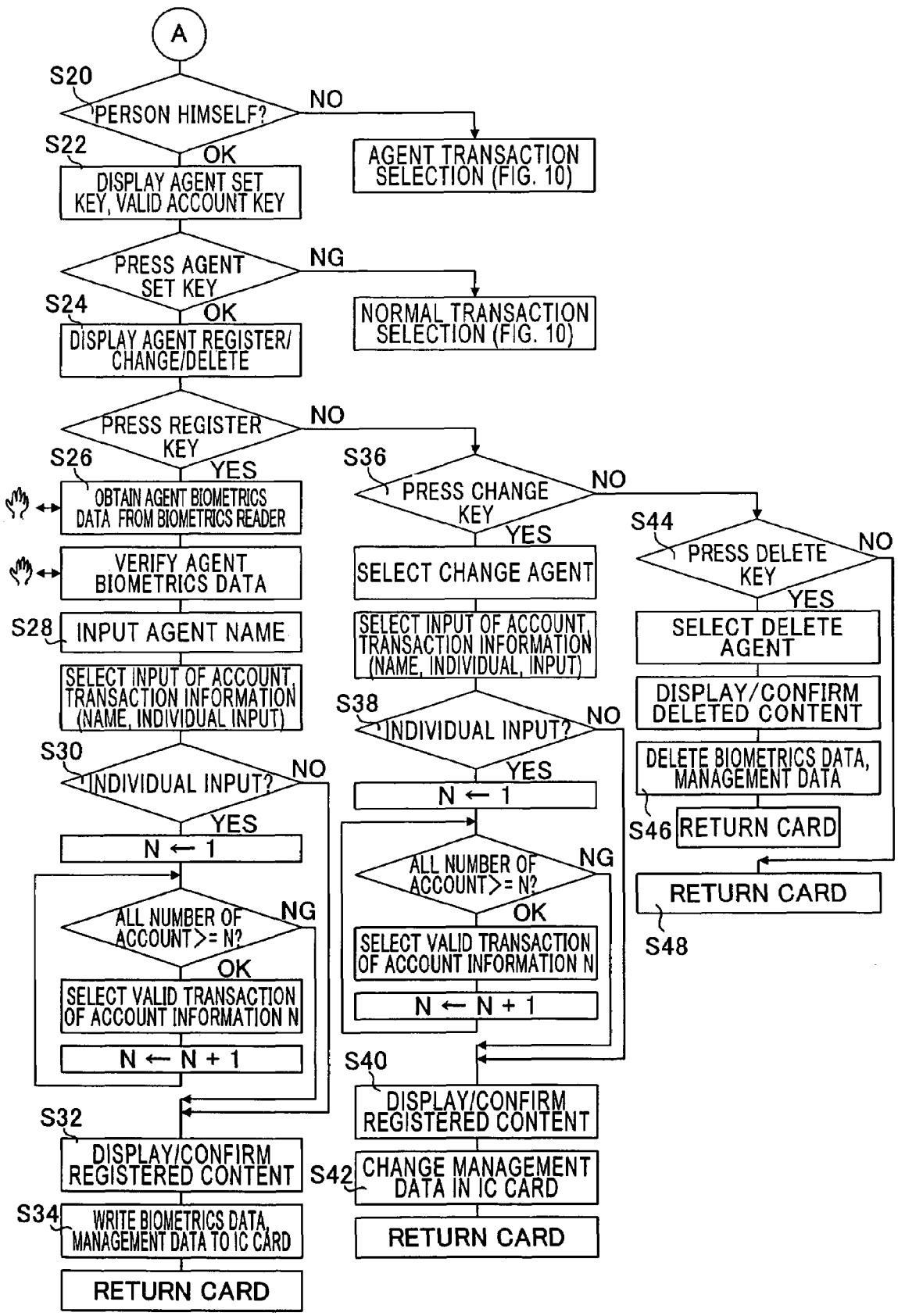
FIG. 9 is a second flow diagram of biometrics authentication and registration processing in this invention.
Figure 10:
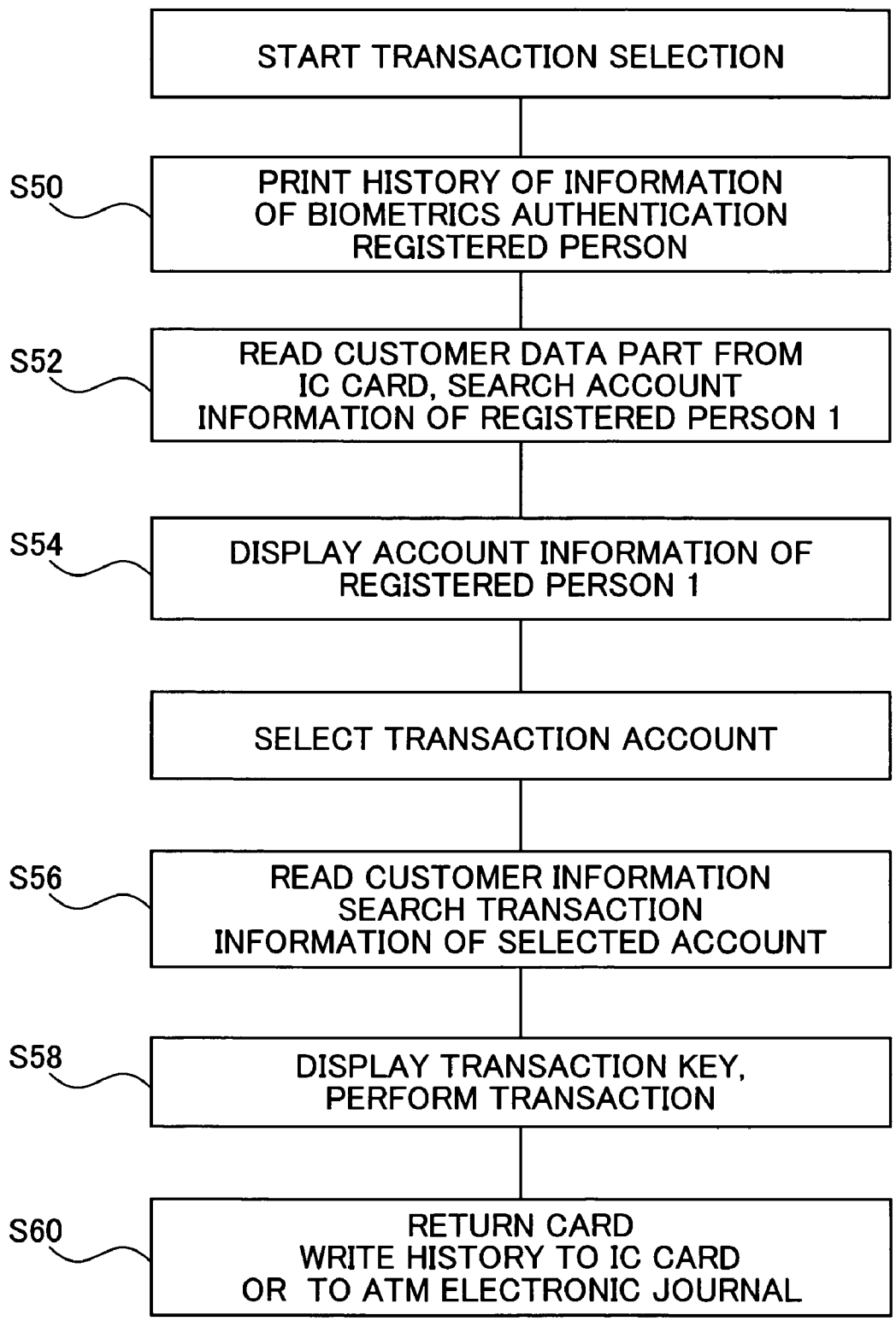
FIG. 10 is a flow diagram of the normal transaction processing in FIG. 8.
Figure 11:
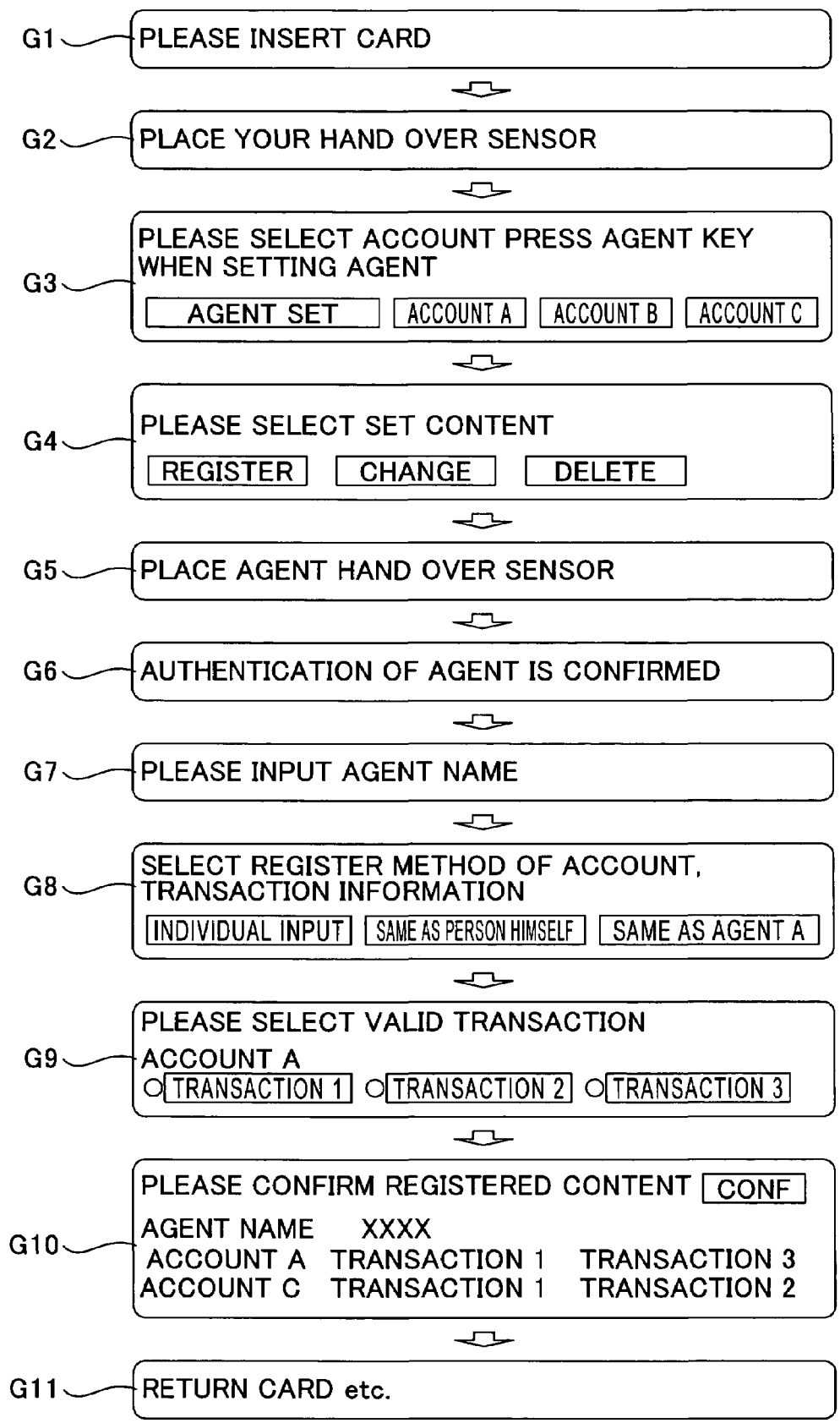
FIG. 11 is an explanatory diagram of operation screens for the registration processing in FIG. 8.
Figure 12:
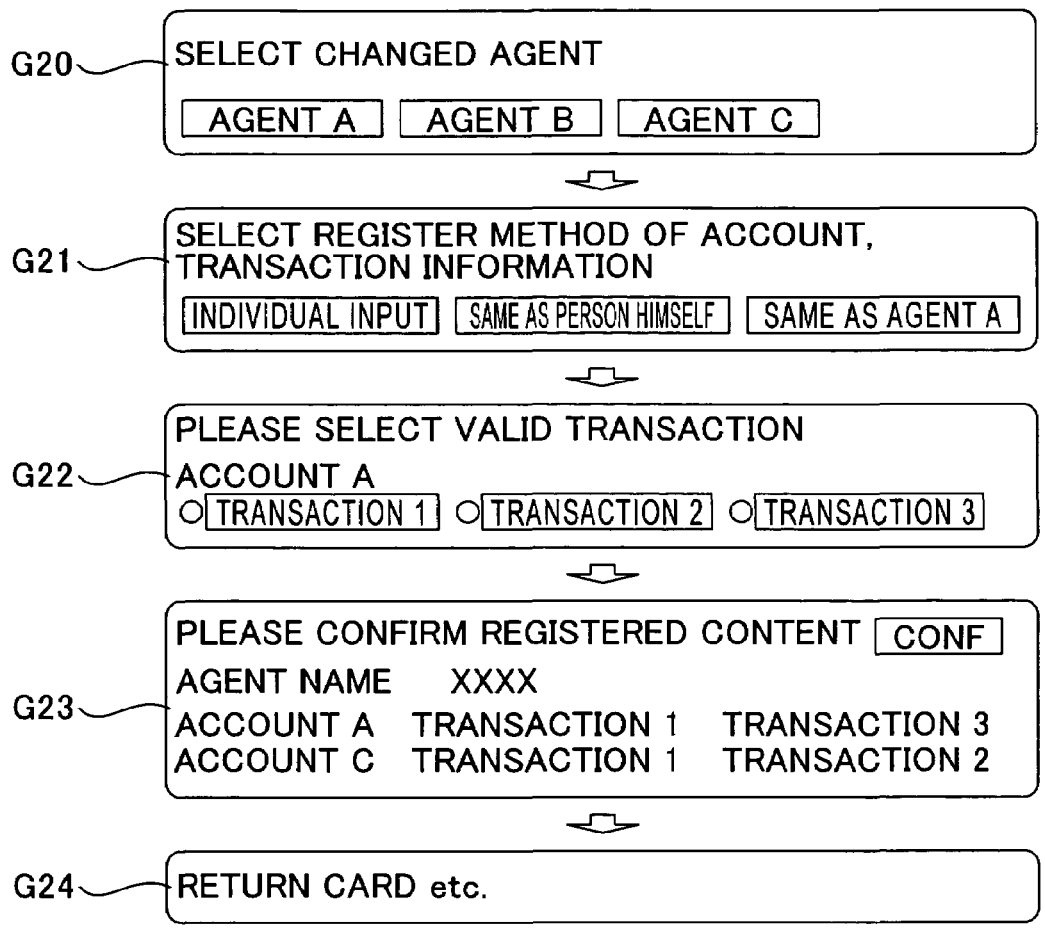
FIG. 12 is an explanatory diagram of operation screens for the modification processing in FIG. 8.
Figure 13:
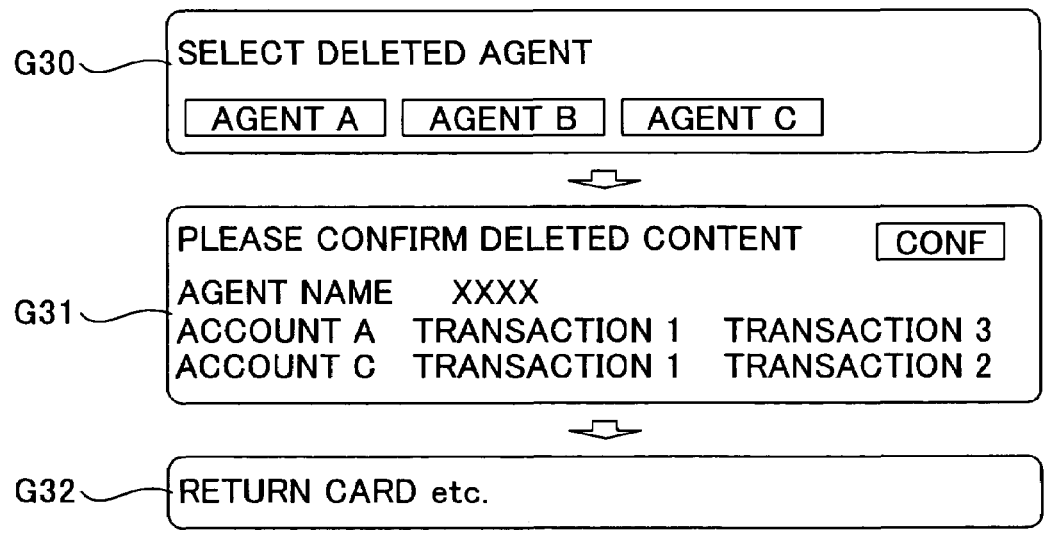
FIG. 13 is an explanatory diagram of operation screens for the deletion processing in FIG. 8; and, FIG. 14 shows the configuration of an authentication library and IC card in another embodiment of the invention.

Next, biometrics information registration/authentication processing is explained, using FIG. 8 through FIG. 13. FIG. 8 through FIG. 10 are flow diagrams of transactions comprising biometrics information registration/authentication processing; FIG. 11 through FIG. 13 explain registration operation guidance screens of FIG. 8 through FIG. 10.

Below, transaction processing comprising the biometrics information registration/authentication processing of FIG. 8 through FIG. 10 is explained, referring to FIG. 11 through FIG. 13.

(S10) In a customer wait state, the control unit 67 of the ATM 6 displays the IC card insertion screen of FIG. 11 on the UOP 6-1.

(S12) When an IC card 5 is inserted by a customer, the API of the authentication library 69 in FIG. 6 issues a read command to the API 46 of the IC card 5, and reads the management data 54 (see FIG. 7) of the IC card 5.

(S14) The control unit 67 of the ATM 6 displays the palm image capture screen G2 in FIG. 11 on the UOP 6-1. The control unit 67 of the ATM 6 executes the image capture processing explained in FIG. 3, and acquires biometrics characteristic data.

(S16) The API of the authentication library 69 in FIG. 6 issues a read command to the API 46 of the IC card 5, and reads the biometrics data 55 (see FIG. 7) of the IC card 5.

(S18) The API of the authentication library 69 in FIG. 6 verifies the biometrics data registered in the management data 54 against the biometrics characteristic data obtained by image capture, and performs authentication. When the authentication result is not favorable (NG), a judgment is made as to whether the number of NG attempts is within a prescribed number. If within the prescribed number, processing returns to step S14. If however the number of NG attempts exceeds the prescribed number, the IC card 5 is returned. This fact is then written to the history information 57 of the IC card 5, or is written to an electronic journal (memory) of the control unit 67 of the ATM 6, and processing ends.

(S20) Proceeding to FIG. 9, if on the other hand authentication is OK in step S18, a judgment is made as to whether the authentication OK is for the principal. If the OK is not for the principal, processing proceeds to a transaction by the proxy in FIG. 10.

(S22) On the other hand, if authentication is OK for the principal, the proxy setting/transaction selection key screen G3 of FIG. 11 is displayed on the UOP 6-1. The proxy selection keys select whether to register, modify or delete a proxy; the transaction selection keys select accounts which can be used by the principal for transactions. If the customer presses a transaction selection key, processing advances to a transaction of the principal in FIG. 10.

(S24) If on the other hand the customer presses the proxy selection key, the proxy registration/modification/deletion key screen G4 of FIG. 11 is displayed on the UOP 6-1.

(S26) If the customer presses the proxy registration screen, the proxy palm image capture screen G5 of FIG. 11 is displayed. The control unit 67 of the ATM 6 executes the image capture processing explained in FIG. 3, and acquires biometrics characteristic data. Then, the image capture processing explained in FIG. 3 is again executed, and biometrics characteristic data is again acquired. The API of the authentication library 69 in FIG. 6 verifies the two sets of biometrics characteristic data thus captured against each other, and performs authentication as confirmation. If the authentication result is OK, then the proxy authentication confirmation screen G6 is displayed on the UOP 6-1.

(S28) The control unit 67 of the ATM 6 displays the proxy name input screen G7 of FIG. 11 on the UOP 6-1. When the customer or proxy inputs the proxy name from the screen on the UOP 6-1, the control unit 67 of the ATM 6 displays the account and transaction information input screen G8 of FIG. 11 on the UOP 6-1. This input screen enables selection from among "Separate input", "Same as principal" and "Same as proxy A".

(S30) In step S28, if separate input is selected, the number of accounts pointer N for selection is initialized to "1". Here 'N' is the number of accounts registered with the principal. Then, the transaction detail selection screen for accounts registered with the principal G9 is displayed on the UOP 6-1. This screen G9 is a screen for selection of transactions (withdrawal, deposit, transfer into account, transfer out of account, or similar) for account A registered with the principal. This selection is repeated for the number of accounts registered with the principal, after which processing proceeds to step S32.

(S32) If in step S28 "Same as principal" or "Same as proxy A" is selected, the transaction information (account information 56 in the IC card 5) for the specified name is used, and the registration detail selection screen G10 is displayed on the UOP 6-1. If however separate selection is chosen in step S30, the registration detail selection screen G10 for the separately selected details (account, transactions) is displayed on the UOP 6-1.

(S34) When in screen G10 the Confirm key is pressed, the corresponding biometrics data and management data are added to the IC card 5. That is, the API of the authentication library 69 in FIG. 6 issues a write command to the API 46 of the IC card 5, then the API 46 appends to the biometrics data 55 and management data 54 (see FIG. 7) to the IC card 5. Specifically, biometrics data is written to the biometrics data area 55, and management data comprising the selected proxy category, name, account information index, transaction flags, and similar is created and written. The media return screen G11 is displayed on the UOP 6-1, and the IC card 5 is returned.

(S36) If on the other hand the Modify key is pressed in step S24, the control unit 67 of the ATM 6 displays the modify proxy input screen G20 of FIG. 12, displaying the names of all proxies registered, on the UOP 6-1. When a customer or proxy inputs the name of a proxy for modification from the screen of the UOP 6-1, the control unit 67 of the ATM 6 displays the account and transaction information input screen G21 of FIG. 12 on the UOP 6-1. This input screen enables selection from among "Separate input", "Same as principal" and "Same as proxy A".

(S38) In step S36, when separate input is selected, the number of accounts pointer N for selection is initialized to "1". Here 'N' is the number of accounts registered with the principal. Then, the transaction detail selection screen for accounts registered with the principal G22 is displayed on the UOP 6-1. This screen G22 is a screen for selection of transactions (withdrawal, deposit, transfer into account, transfer out of account, or similar) for account A registered with the principal. This selection is repeated for the number of accounts registered with the principal, after which processing proceeds to step S40.

(S40) Next, if in step S36 "Same as principal" or "Same as proxy A" is selected, the transaction information (account information 56 in the IC card 5) for the specified name is used, and the modification detail selection screen G23 is displayed on the UOP 6-1. If however separate selection is chosen in step S38, the modification detail selection screen G23 for the separately selected details (account, transactions) is displayed on the UOP 6-1.

(S42) When in screen G23 the Confirm key is pressed, the corresponding biometrics data and management data are modified in the IC card 5. That is, the API of the authentication library 69 in FIG. 6 issues a write command to the API 46 of the IC card 5, then the API 46 modifies the management data 54 (see FIG. 7) to the IC card 5. Specifically, the account information index, transaction flags, and similar for the selected proxy are modified. The media return screen G24 is then displayed on the UOP 6-1, and the IC card 5 is returned.

(S44) If on the other hand the Delete key is pressed in step S24, the control unit 67 of the ATM 6 displays the delete proxy input screen G30 of FIG. 13, displaying the names of all proxies registered, on the UOP 6-1. When a customer or proxy inputs the name of a proxy from the screen of the UOP 6-1, the control unit 67 of the ATM 6 uses transaction information (the account information 56 in the IC card 5) of the specified name to display the deletion detail confirmation screen G31 on the UOP 6-1, displaying registration details for the proxy.

(S46) When in screen G31 the Confirm key is pressed, the corresponding biometrics data and management data are deleted in the IC card 5. That is, the API of the authentication library 69 in FIG. 6 issues a write command to the API 46 of the IC card 5, to write null (all "1"s) to the biometrics data 55 and management data 54 (see FIG. 7) in the IC card 5. The media return screen G32 is then displayed on the UOP 6-1, and the IC card 5 is returned.

(S48) If on the other hand a key is not pressed for a prescribed time interval in step S24, or if the Cancel key is pressed, the IC card 5 is returned.

Next, FIG. 10 is used to explain normal transactions by a proxy or by the principal in steps S20 and S22.

(S50) If authentication of the proxy or principal is satisfactory, information for the person who has been biometrics authenticated is printed, as history, on the journal printer of FIG. 2.

(S52) The customer data portion in the IC card 5 for the proxy or principal who has been authenticated is read. That is, the API of the authentication library 69 in FIG. 6 issues a search command to the API 46 of the IC card 5, and account information 56 is read from the account index of the management data 54 (see FIG. 7) in the IC card 5 for the relevant individual.

(S54) The control unit 67 displays the read-out account information on the UOP 6-1. The user selects the account (presses a displayed account) for the transaction from the account information displayed on the UOP 6-1.

(S56) The customer information data portion within the IC card 5 for the authenticated proxy or principal is read. That is, the API of the authentication library 69 in FIG. 6 issues a search command to the API 46 of the IC card 5, and transaction flags for the account index in the management data 54 (see FIG. 7) in the IC card 5 for the relevant individual are read.

(S58) The control unit 67 displays registered transaction details for the read-out account on the UOP 6-1. The user selects the details for the transaction (presses a displayed transaction) from the transaction details displayed on the UOP 6-1. By this means, well-known operations to input a transaction amount, input a transfer destination (in the case of transfer) and similar are performed, communication with the host is executed, and the transaction processing is executed.

(S60) After transaction execution, the transaction history is written to the history information 57 in the IC card 5, or is written to an electronic journal (memory) in the control unit 67 of the ATM 6, and processing ends.

In this way, when biometrics authentication of the principal is satisfactory, registration of biometrics information for an authorized agent can be performed, so that biometrics information for an authorized agent can be registered securely on a card on which biometrics information for the principal is registered. Similarly, biometrics information for an authorized agent can be modified or deleted securely on a card on which biometrics information for the principal is registered.

Further, biometrics information for an authorized agent can be modified securely on a card on which biometrics information for the principal is registered, and the security of biometrics information for an authorized agent can be ensured. Further, management data is provided in the IC card, so that use by a plurality of persons is made possible, and registration and deletion of authorized agents, as well as registration and modification of transaction details, can be easily accomplished.

OTHER EMBODIMENTS

Figure 14:
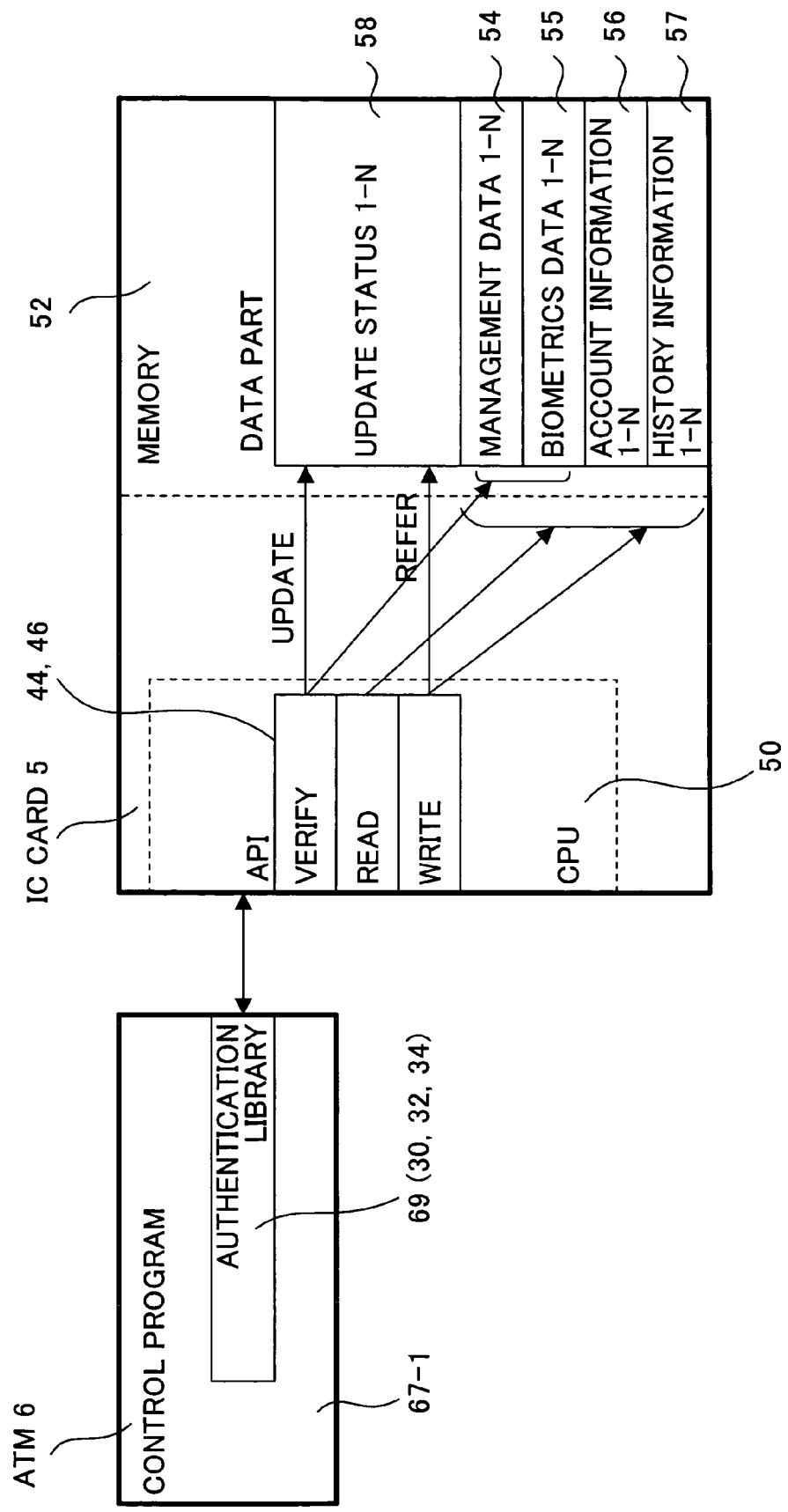

FIG. 14 shows the configuration of an authentication library 69 and IC card 5 in another embodiment of the invention of FIG. 2 and FIG. 3. As shown in FIG. 14, the authentication library (program) 69 provided in the control program 67-1 of the ATM 6 has the distance/hand outline detection processing portion 30, guidance message output processing portion 32, and blood vessel image extraction processing portion 34 shown in FIG. 3.

On the other hand, the IC card 5 has a CPU (Central Processing Unit) 50 and memory 52. The CPU 50 executes the verification processing 44 and registered blood vessel image search/registration processing (read/write processing) 46 shown in FIG. 3. The memory 52 has the management data area 54, biometrics data area 55, account information area 56, and history information area 57 explained in FIG. 7.

In this embodiment, the verification processing 44 is provided within the IC card 5, and update status information 58 is provided in each set of management data 54. This verification processing 44 performs authentication processing, and when the person for authentication processing is the principal, renders valid the update status information 58 ('1' through 'n'). Further, writing of management data 54 and biometrics information 55 is possible when the relevant update status information 58$m$ is valid. After execution of writing, the update status information 58$m$ is rendered invalid.

On the other hand, an attempt to write management data 54 or biometrics information 55 causes an error to be returned, because the update status information 58$m$ is invalid. Upon rendering the IC card inactive, the update status information ('1' through 'n') becomes invalid.

That is, when the result of principal authentication is satisfactory, writing of biometrics information 55 and management data 54, that is, the registration, modification, and deletion of a proxy, is possible. Thus security of individual information is maintained within the IC card 5, and in particular tampering becomes impossible, and the leakage to third parties of individual information (biometrics information, management information) can be prevented.

In the above-described embodiments, authentication was explained for cases in which vein patterns in the palm of the hand are used for biometrics authentication; but application to authentication using finger vein patterns, to palm-prints and other characteristics of the hand, as well as to authentication using fingerprints, facial features, and to other contact-free authentication methods is possible. Further, automated equipment used in financial operations was explained; but application to automated ticket issuing equipment, automated vending equipment, and to automated machines and computers in other areas, as well as to door opening/closing equipment in place of keys, and to other equipment where individual authentication is required, is possible.

In the above, embodiments of the invention have been explained; but the invention can be variously modified within the scope of the invention, and these modifications are not excluded from the scope of the invention.

When biometrics authentication of the principal is satisfactory, registration of biometrics information can be performed for an authorized agent, so that biometrics information for the authorized agent can be registered securely on a card on which is registered biometrics information for the principal. Similarly, biometrics information for an authorized agent can be modified and deleted securely on a card on which is registered biometrics information for the principal, so that biometrics authentication can be accomplished securely for a plurality of persons using a single card, thereby contributing to the widespread adoption of biometrics authentication equipment.

What is claimed is:

1. An authorized agent information registration method for a biometrics authentication device in an automatic transaction device, which detects biometrics characteristic data from a human body and verifies said biometrics characteristic data against biometrics characteristic data registered in advance in an IC card to perform individual authentication, comprising the steps of:

detecting said biometrics characteristic data from said human body;

reading biometrics characteristic data of a principal from an IC card of said principal;

verifying said detected biometrics characteristic data against the biometrics characteristic data of said principal registered in advance in said IC card;

detecting said biometrics characteristic data from the body of an authorized agent other than said principal when said verification result is satisfactory; and registering the biometrics characteristic data of said authorized agent in said IC card for admission of operating said automatic transaction device by said biometrics authentication device.

2. The authorized agent information registration method for a biometrics authentication device according to claim 1, wherein said registration step further comprises:

a step of again detecting said biometrics characteristic data from the body of said authorized agent; and a confirmation step of verifying said detected biometrics characteristic data of the authorized agent against said again-detected biometrics characteristic data of the authorized agent.

3. The authorized agent information registration method for a biometrics authentication device according to claim 1, wherein said registration step further comprises a step of registering, in said IC card, authorization details for an authorized agent other than the principal.

4. The authorized agent information registration method for a biometrics authentication device according to claim 3, further comprising a step of modifying and registering said authorization details registered in said IC card in response to a modification request when said verification result is satisfactory.

5. The authorized agent information registration method for a biometrics authentication device according to claim 3, further comprising a step of selecting the authorization details of said authorized agent,
wherein said registration step comprises a step of registering, in said IC card, said selected authorization details of said authorized agent.

6. The authorized agent information registration method for a biometrics authentication device according to claim 5, wherein said selection step comprises:
a step of separately selecting authorization details of said authorized agent; and
a step of selecting the transaction details of said principal as the authorization details of said authorized agent.

7. The authorized agent information registration method for a biometrics authentication device according to claim 3,
wherein said registration step comprises a step of registering separately, in said IC card, biometrics characteristic data for said principal and authorized agent, and management data to discriminate and link said biometrics characteristic data with said principal and with said authorized agent.

8. The authorized agent information registration method for a biometrics authentication device according to claim 3,
wherein said registration step comprises a step of registering separately, in said IC card, biometrics characteristic data for said principal and authorized agent, and management data to discriminate, and to link to said authorization details, said biometrics characteristic data with said principal and with said authorized agent.

9. The authorized agent information registration method for a biometrics authentication device according to claim 1, further comprising a step of deleting the biometrics characteristic data of said authorized agent which is registered in said IC card from said IC card in response to a deletion request when said verification result is satisfactory.

10. A biometrics authentication method in an automatic transaction device for detecting biometrics characteristic data from a human body and verifying against biometrics characteristic data registered in advance in an IC card to perform individual authentication, comprising the steps of:
detecting said biometrics characteristic data from said human body;
reading biometrics characteristic data of a principal from an IC card of said principle;
verifying said detected biometrics characteristic data against the biometrics characteristic data of said principal registered in advance in said IC card;
detecting said biometrics characteristic data from the body of an authorized agent other than the principal when said verification result is satisfactory;
registering the biometrics characteristic data of said authorized agent in said IC card;
detecting biometrics characteristic data from a human body after registering said biometrics characteristic data of both said principal and said authorized agent in said IC card;
reading the biometrics characteristic data of the principal or the authorized agent from said IC card of said principal: and
verifying said biometrics characteristic data detected from said human body after registering said biometrics characteristic data of both said principal and said authorized agent against the biometrics characteristic data of the principal or of the authorized agent registered in advance in the IC card for admission of operating said automatic transaction device.

11. The biometrics authentication method according to claim 10, further comprising:
a step of again detecting said biometrics characteristic data from the body of said authorized agent; and
a confirmation step of verifying said detected biometrics characteristic data of the authorized agent against said again-detected biometrics characteristic data of the authorized agent.

12. The biometrics authentication method according to claim 10, wherein said registration step further comprises a step of registering, in said IC card, authorization details of an authorized agent other than the principal.

13. The biometrics authentication method according to claim 12, further comprising a step of modifying and registering said authorization details registered in said IC card in response to a modification request, when said verification result is satisfactory.

14. The biometrics authentication method according to claim 12, further comprising a step of selecting the authorization details of the authorized agent other than said principal,
wherein said registration step comprises a step of registering, in said IC card, said selected authorization details of said authorized agent other than the principal.

15. The biometrics authentication method according to claim 14, wherein said selection step comprises:
a step of separately selecting authorization details of the authorized agent other than said principal; and
a step of selecting the transaction details of said principal as the authorization details of the authorized agent other than said principal.

16. The biometrics authentication method according to claim 12,
wherein said registration step comprises a step of registering separately, in said IC card, biometrics characteristic data for said principal and authorized agent, and management data to discriminate and link said biometrics characteristic data with said principal and with said authorized agent.

17. The biometrics authentication method according to claim 12,
wherein said registration step comprises a step of registering separately, in said IC card, biometrics characteristic data for said principal and authorized agent, and management data to discriminate, and to link to said authorization details, said biometrics characteristic data with said principal and with said authorized agent.

18. The biometrics authentication method according to claim 10, further comprising a step of deleting the biometrics characteristic data of said authorized agent which is registered in said IC card, in response to a deletion request, when said verification result is satisfactory.

19. A biometrics authentication device in an automatic transaction device, which detects biometrics characteristic data from a human body, verifies said biometrics characteristic data against biometrics characteristic data registered in advance in an IC card, and performs individual authentication, comprising:
- a detection unit, which detects biometrics characteristic data from said human body;
- an IC card reader/writer, which reads information from an IC card of a principal and writes information into said IC card; and
- a verification unit, which verifies said detected biometrics characteristic data against the biometrics characteristic data of said principal, registered in advance in said IC card and read from said IC card via the IC card reader/writer,
- wherein said verification unit, when said verification result is satisfactory, detects the biometrics characteristic data from a body other than that of the principal and registers the biometrics characteristic data for an authorized agent other than said principal in said IC card via the IC card reader/writer, and at the time of individual authentication for operating said automatic transaction device, detects the biometrics characteristic data from the human body, and verifies said detected biometrics characteristic data against the biometrics characteristic data of the principal or of the authorized agent, registered in advance in said IC card.

20. The biometrics authentication device according to claim 19, wherein said verification unit again detects biometrics characteristic data from said body of said authorized agent, and verifies said detected biometrics characteristic data of said authorized agent against said again-detected biometrics characteristic data of said authorized agent.

21. The biometrics authentication device according to claim 19, wherein said verification unit further registers authorization details of an authorized agent other than the principal in said IC card.

22. The biometrics authentication device according to claim 21, wherein, when said verification result is satisfactory, in response to a modification request, said verification unit modifies, and registers in said IC card, the authorization details registered in said IC card.

23. The biometrics authentication device according to claim 21, wherein, in accordance with selection of the authorization details of said authorized agent, said verification unit registers in said IC card the selected authorization details of said authorized agent other than the principal.

24. The biometrics authentication device according to claim 23, wherein, in accordance with individually selected authorization details of said authorized agent and selection of transaction details of said principal as authorization details for the authorized agent other than said principal, said verification unit registers said authorization details in said IC card.

25. The biometrics authentication device according to claim 19, wherein said verification unit separately registers, in said IC card, biometrics characteristic data for said principal and authorized agent, and management data to discriminate and link said biometrics characteristic data with said principal and with said authorized agent.

26. The biometrics authentication device according to claim 21, wherein said verification unit separately registers, in said IC card, biometrics characteristic data for said principal and authorized agent, and management data to discriminate, and to link to said authorization details, said biometrics characteristic data with said principal and with said authorized agent.

27. The biometrics authentication device according to claim 19, wherein, when said verification result is satisfactory, in response to a deletion request, said verification unit deletes the biometrics characteristic data of the authorized agent other than said principal which is registered in said IC card, from said IC card.

* * * * *